(12) United States Patent
Inoue et al.

(10) Patent No.: US 8,897,441 B2
(45) Date of Patent: Nov. 25, 2014

(54) PACKET TRANSMITTING AND RECEIVING APPARATUS AND PACKET TRANSMITTING AND RECEIVING METHOD

(75) Inventors: Toshifumi Inoue, Kawasaki (JP); Isamu Fukuda, Kawasaki (JP); Kenji Fukuda, Kawasaki (JP); Kiyohisa Hoshino, Kawasaki (JP); Nobuyuki Fukuda, Kawasaki (JP); Yoshiaki Fukunaga, Kawasaki (JP); Satoru Hirasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 12/781,435

(22) Filed: May 17, 2010

(65) Prior Publication Data

US 2010/0303233 A1    Dec. 2, 2010

(30) Foreign Application Priority Data

May 26, 2009    (JP) .................................. 2009-126789

(51) Int. Cl.
*H04L 9/00*    (2006.01)
*H04L 9/08*    (2006.01)
*H04W 12/04*   (2009.01)

(52) U.S. Cl.
CPC ............. *H04L 9/0841* (2013.01); *H04W 12/04* (2013.01); *H04L 2209/80* (2013.01); *H04L 2209/08* (2013.01)
USPC ............. 380/44; 380/278; 380/286; 713/150; 713/160; 713/171

(58) Field of Classification Search
CPC ........... H04L 9/00; H04L 9/14; H04L 9/0841; H04L 9/083; H04L 9/0833; H04L 9/0838; H04L 63/06; H04L 63/061; H04L 63/0428; H04L 65/403; H04L 65/60; H04L 65/601; H04L 65/607; H04L 2209/60; H04W 12/04; G06F 21/00
USPC ............. 380/277–286, 44–46; 713/150, 160, 713/171

See application file for complete search history.

(56) References Cited

U.S. PATENT DOCUMENTS

| | | | | |
|---|---|---|---|---|
| 6,771,597 B2 * | 8/2004 | Makansi et al. | ............... | 370/230 |
| 8,577,022 B2 * | 11/2013 | Nakamura | ...................... | 380/28 |
| 8,583,929 B2 * | 11/2013 | Patel et al. | .................... | 713/171 |
| 2005/0005148 A1 * | 1/2005 | Ishibashi et al. | ............... | 713/193 |
| 2005/0108576 A1 * | 5/2005 | Munshi | ......................... | 713/201 |
| 2008/0005564 A1 * | 1/2008 | Agarwal | ........................ | 713/171 |

(Continued)

FOREIGN PATENT DOCUMENTS

JP    2006-311164 A    11/2006

*Primary Examiner* — Jeffrey Pwu
*Assistant Examiner* — Jayesh Jhaveri
(74) *Attorney, Agent, or Firm* — Fujitsu Patent Center

(57) ABSTRACT

When being triggered by a call setting request that has been made, dummy information that is different from information to be transmitted and is information used for creating a path on which encrypted communication is to be performed is generated. The path on which the encrypted communication is to be performed is established by using the generated dummy information. A responding process of responding to the call setting request is performed after the path on which the encrypted communication is to be performed has been established. Thus, in the case where information that is obtained after the responding process of responding to the call setting request is encrypted and transmitted, it is possible to transmit the information while maintaining the real-time characteristics of the information to be transmitted.

4 Claims, 12 Drawing Sheets

(56) References Cited

U.S. PATENT DOCUMENTS

| | | | |
|---|---|---|---|
| 2008/0072035 A1* | 3/2008 | Johnson et al. | 713/153 |
| 2008/0279158 A1* | 11/2008 | Schmidt et al. | 370/338 |
| 2008/0298593 A1* | 12/2008 | Shen | 380/278 |
| 2009/0063856 A1* | 3/2009 | Dunn et al. | 713/160 |
| 2009/0086971 A1* | 4/2009 | Grayson et al. | 380/247 |
| 2010/0111308 A1* | 5/2010 | Forsberg et al. | 380/278 |
| 2010/0239086 A1* | 9/2010 | Johnston et al. | 380/43 |
| 2012/0198527 A1* | 8/2012 | Naslund et al. | 726/6 |

* cited by examiner

PACKET TRANSMITTING AND RECEIVING APPARATUS AND PACKET TRANSMITTING AND RECEIVING METHOD

CROSS-REFERENCE TO RELATED APPLICATION

This application is based upon and claims the benefit of priority of the prior Japanese Patent Application No. 2009-126789, filed on May 26, 2009, the entire contents of which are incorporated herein by reference.

FIELD

The embodiments discussed herein are directed to a packet transmitting and receiving apparatus and a packet transmitting and receiving method used in information communication.

BACKGROUND

In recent years, as a technique related to information security, a communication technique by which encrypted information is transmitted and received between a transmission origin communication apparatus (hereinafter, a "transmission origin apparatus") that transmits information and a transmission destination communication apparatus (hereinafter, a "transmission destination apparatus") that receives the information has been implemented. As examples of such a technique used for performing communication by encrypting information, communication techniques that use Security Architecture for Internet Protocol (IPsec) are known (see, for example, Japanese Laid-open Patent Publication No. 2006-311164).

In the following sections, a specific process that is performed by a transmission origin apparatus will be explained. Before obtaining user data, which is information to be transmitted, the transmission origin apparatus performs a call setting process to set a processing path within the apparatus. After having established a call setting, the transmission origin apparatus obtains the user data, encrypts the obtained user data, and transmits the encrypted user data to a transmission destination apparatus, as illustrated in FIG. 11.

In this situation, in the case where a security association (SA) has been established between the transmission origin apparatus and the transmission destination apparatus, the transmission origin apparatus encrypts the user data by using the SA that has been established with the transmission destination apparatus. The SA is information related to an encryption key used for encrypting information to be exchanged with the transmission destination apparatus.

In contrast, in the case where, as illustrated in FIG. 12, no SA has been established with the transmission destination apparatus, the transmission origin apparatus temporarily stores the obtained user data and establishes an SA by exchanging a key with the transmission destination apparatus. After that, when the SA has been established with the transmission destination apparatus, the transmission origin apparatus encrypts the temporarily-stored user data by using the SA. The transmission origin apparatus then transmits the encrypted user data to the transmission destination apparatus.

In this situation, when changing the transmission destination apparatus to another communication apparatus, the transmission origin apparatus establishes an SA also with the communication apparatus serving as the new transmission destination. It means that the transmission origin apparatus needs to temporarily store the information to be transmitted and establishes the new SA when changing the transmission destination apparatus to the new communication apparatus.

According to the technique by which an SA is established after a call setting process has been performed, however, in the case where no SA has been established with the transmission destination apparatus, the SA establishing process is started when being triggered by obtainment of the user data. For this reason, when no SA has been established, the user data is temporarily stored and it is therefore not possible to encrypt and transmit the user data until an SA is established. Thus, the user data transmitting process is suspended. It means that, when no SA has been established, the transmission origin apparatus suspends the user data until the SA has been established. As a result, a problem arises where it is not possible to maintain real-time characteristics.

For example, according to the technique described above by which an SA is established after a call setting process has been performed, in the case where encrypted communication is performed with information that requires real-time characteristics in, for example, communication using a video conference system or a video phone or communication to distribute live pictures, it is necessary to temporarily store the information until the SA is established. As a result, according to the technique by which an SA is established after a call setting process has been performed, the flow of the information is suspended when the SA has not yet been established. Thus, the problem arises where it is not possible to maintain the real-time characteristics.

Also, when changing the transmission destination apparatus to another communication apparatus, the transmission origin apparatus needs to newly establish an SA and suspends the user data until the SA is established. As a result, the problem arises where it is not possible to maintain the real-time characteristics.

SUMMARY

According to an aspect of an embodiment of the invention, a packet transmitting and receiving apparatus includes an encryption processing unit that, when transmission data to be transmitted to a transmission destination apparatus is received, judges whether an encryption key exchanged with the transmission destination apparatus is registered and that is configured, in a case where the encryption key is registered, so as to encrypt the transmission data by using the encryption key and to transmit the encrypted transmission data to the transmission destination apparatus and, in a case where the encryption key is not registered, so as to exchange the encryption key with the transmission destination apparatus and to register the encryption key; a substitute data notifying unit that, when a call setting request from a controlling unit that is made prior to the transmission of the transmission data is received, notifies the encryption processing unit of dummy transmission data that is equivalent to the transmission data; and a call setting completion notifying unit that, when the encryption processing unit receives the dummy transmission data and exchanges the encryption key with the transmission destination apparatus so that the encryption key is registered, notifies the controlling unit that a call setting process performed in response to the call setting request has been completed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments will be explained with reference to accompanying drawings.

Figure 1:
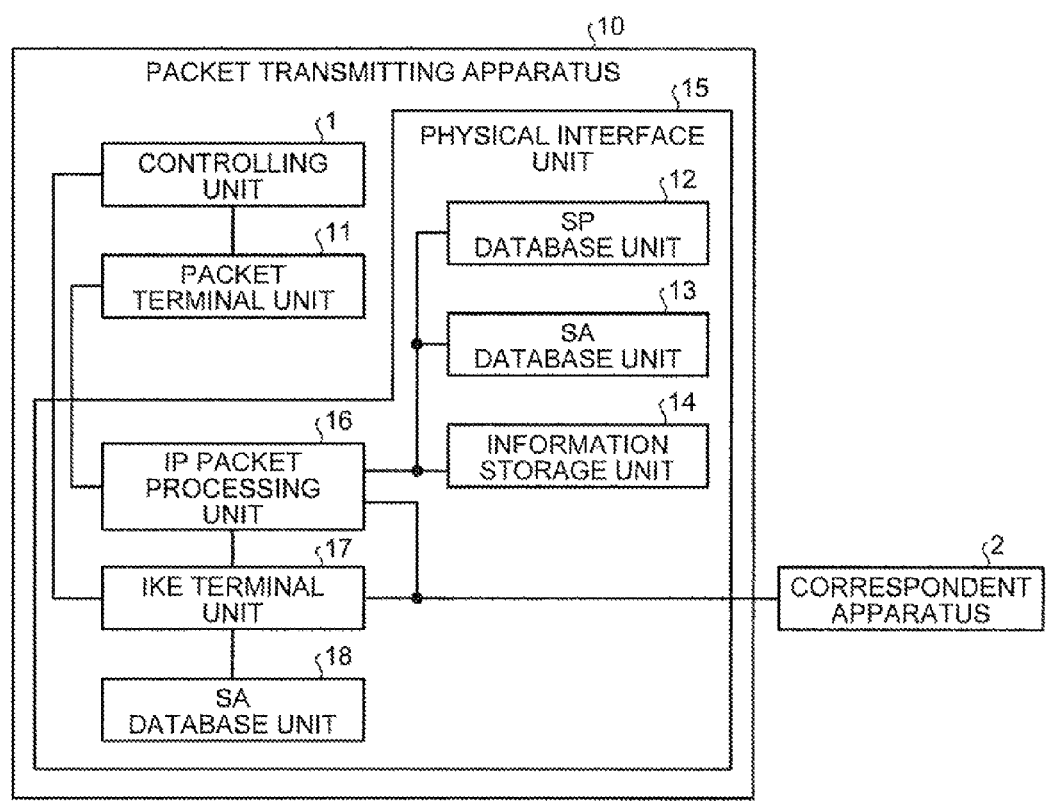
FIG. 1 is a block diagram of a packet transmitting apparatus according to a first embodiment.

In the description of the exemplary embodiments below, packet transmitting apparatuses and flows of processes will be sequentially explained. First, a configuration of a packet transmitting apparatus according to a first embodiment will be explained, with reference to FIG. 1. FIG. 1 is a block diagram of the packet transmitting apparatus according to the first embodiment.

A packet transmitting apparatus 10 includes a controlling unit 1, a packet terminal unit 11, and a physical interface unit 15 and is connected to a correspondent apparatus 2. The physical interface unit 15 includes a Security Policy (SP) database unit 12, a Security Association (SA) database unit 13, an information storage unit 14, an Internet Protocol (IP) packet processing unit 16, an Internet Key Exchange (IKE) terminal unit 17, and an SA database unit 18.

The SP database unit 12 stores therein one or more Security Policies (SPs) each of which is information defining what encrypting process may be performed depending on the type of the information to be transmitted. The SA database unit 13 and the SA database unit 18 each store therein one or more Security Associations (SAs) each of which is information related to an encryption key.

For example, the SA database unit 13 and the SA database unit 18 each store therein, as the SAs, encryption keys each of which is applied to a different one of transmission destinations. In this situation, the SA database unit 13 and the SA database unit 18 each store therein the SAs each of which is applied to information to be transmitted according to a corresponding one of the SPs stored in the SP database unit 12. For example, in the case where the SP applied to the information to be transmitted indicates that encryption keys that respectively correspond to Internet Protocol (IP) addresses of transmission destinations should be used, the SA database unit 13 and the SA database unit 18 each store therein SAs that respectively correspond to the IP addresses of the transmission destinations.

As another example, in the case where the SP applied to the information to be transmitted indicates that encryption keys that respectively correspond to receiving ports at the transmission destinations should be used, the SA database unit 13 and the SA database unit 18 each store therein SAs that are respectively applied to the receiving ports at the transmission destinations. In the present example, it is assumed that the SP database unit 12 according to the first embodiment stores therein, as an example of the SPs, an SP indicating that information should be encrypted in correspondence with each of the receiving ports at the transmission destinations.

Further, the SP database unit 12 stores therein information indicating whether bidirectional SAs need to be established or a one-way SA needs to be established, when an SA is to be established with a transmission destination. For example, the SP database unit 12 stores therein, as an example of the stored SPs, an SP indicating that information should be encrypted in correspondence with each of the receiving ports at the transmission destinations and that SAs should be established in a bidirectional manner.

The SP database unit 12 stores therein SPs that are used by the IP packet processing unit 16. The SA database unit 13 stores therein the SAs that are used by the IP packet processing unit 16. The SA database unit 18 stores therein the SAs that are used by the IKE terminal unit 17. The SA database units 13 and 18 store therein mutually the same SAs.

The correspondent apparatus 2 is a transmission destination of information. In a situation where the information to be transmitted is transmitted by using a tunnel mode defined by IPsec, an example of the correspondent apparatus 2 is a security gateway that corresponds to a local network in which a transmission destination of user data is present.

The controlling unit 1 controls a process to transmit information. Also, in the case where user data is present, the controlling unit 1 transmits a call setting request to the packet terminal unit 11. In this situation, the call setting request is a request requesting that a processing path within the apparatus used for transmitting the user data to a transmission destination apparatus and the transmission destination apparatus should be established.

Further, when having received a response to a call setting request from the packet terminal unit 11, the controlling unit 1 transmits permission to the packet terminal unit 11, the permission authorizing that a transmitting process performed on the information to be transmitted to the correspondent apparatus 2 be started.

When having received a call setting request from the controlling unit 1, the packet terminal unit 11 generates dummy information that is substitute information of the information to be transmitted and transmits the generated dummy information to the IP packet processing unit 16. More specifically, when having received a call setting request from the controlling unit 1, the packet terminal unit 11 generates dummy transmission data (hereinafter, also a "dummy packet") containing an IP address contained in the call setting request and transmits the generated dummy packet to the IP packet processing unit 16. Also, the packet terminal unit 11 generates a dummy packet for each of receiving ports of the correspondent apparatus 2.

Further, when an SA has been established, the packet terminal unit 11 transmits a response to the call setting request to the controlling unit 1. More specifically, when having obtained information indicating that the IKE terminal unit 17 has established an SA from the IP packet processing unit 16, the packet terminal unit 11 transmits the response to the call setting request to the controlling unit 1.

In this situation, the call setting request contains the IP address indicating the transmission destination to which the information is to be transmitted. When having received a call setting request, the packet terminal unit 11 generates the dummy packet containing the IP address of the transmission destination contained in the call setting request and transmits the generated dummy packet to the IP packet processing unit 16.

The dummy packet is configured with information that is different from the user data and is generated for starting the process of establishing the SA. Also, the dummy packet is information that has no influence at all on the user data to be transmitted. The dummy packet contains the IP address indicating the transmission destination of the user data.

When having received a call setting request from the controlling unit 1, the packet terminal unit 11 generates a dummy packet and transmits the generated dummy packet to the IP packet processing unit 16. Also, when having received an SA establishment notification notifying that an SA has been established from the IP packet processing unit 16, the packet terminal unit 11 transmits a response to the call setting request to the controlling unit 1.

Next, a relationship between a protocol used for managing SAs and a process performed on a dummy packet will be explained. Due to a layer structure defined by Transmission Control Protocol/Internet Protocol (TCP/IP), there are situations in which each of the SAs is managed not only by a protocol in an IP layer (Layer 3) but also by protocols in Layer 4 and Layer 5, which are superordinate layers of Layer 3.

For example, there are situations in which the packet transmitting apparatus 10 transmits user data by specifying an IP address of the transmission destination and a receiving port number of the transmission destination, as the transmission destination of the user data. A protocol used for managing port numbers is executed in a layer that is superordinate to the IP layer. For this reason, there are situations in which a protocol used for managing SAs is managed by protocols each of which operates in a layer that is Layer 4 or a superordinate layer thereof.

In this situation, the protocols each of which operates in a layer that is Layer 4 or a superordinate layer thereof include a protocol in which a mechanism called an echo request is incorporated. In the case where received information contains an echo request, the transmission destination apparatus performs a process of transmitting the same information as the received information to the transmission origin apparatus.

When the packet transmitting apparatus 10 has encrypted a dummy packet containing an echo request and has transmitted the encrypted dummy packet to the correspondent apparatus 2, the correspondent apparatus 2 returns the encrypted dummy packet. As a result, the packet transmitting apparatus 10 is able to check to see if bidirectional SAs have been established and if a connection to the correspondent apparatus 2 is valid.

Figure 6:
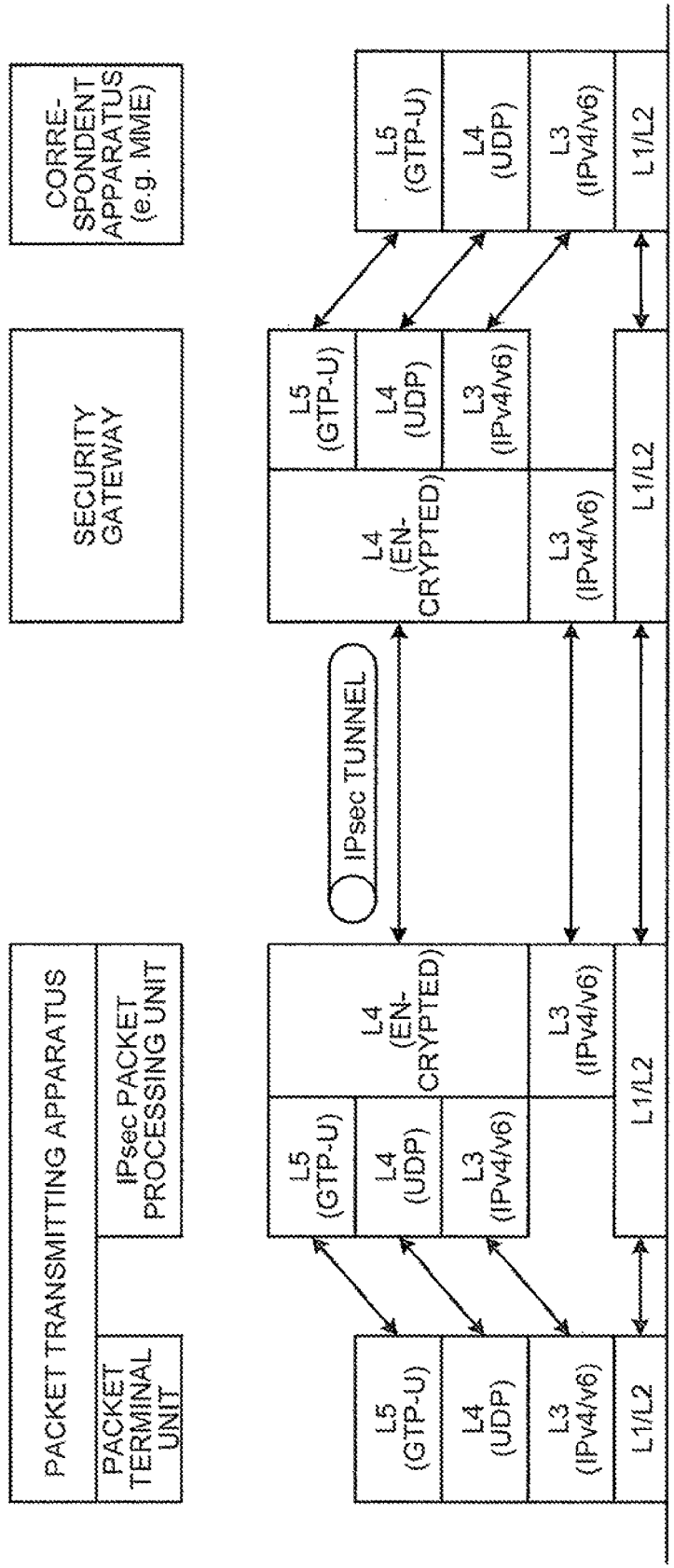
FIG. 6 is a first drawing depicting an example of a protocol stack related to the packet transmitting apparatus according to the first embodiment.
Figure 7:
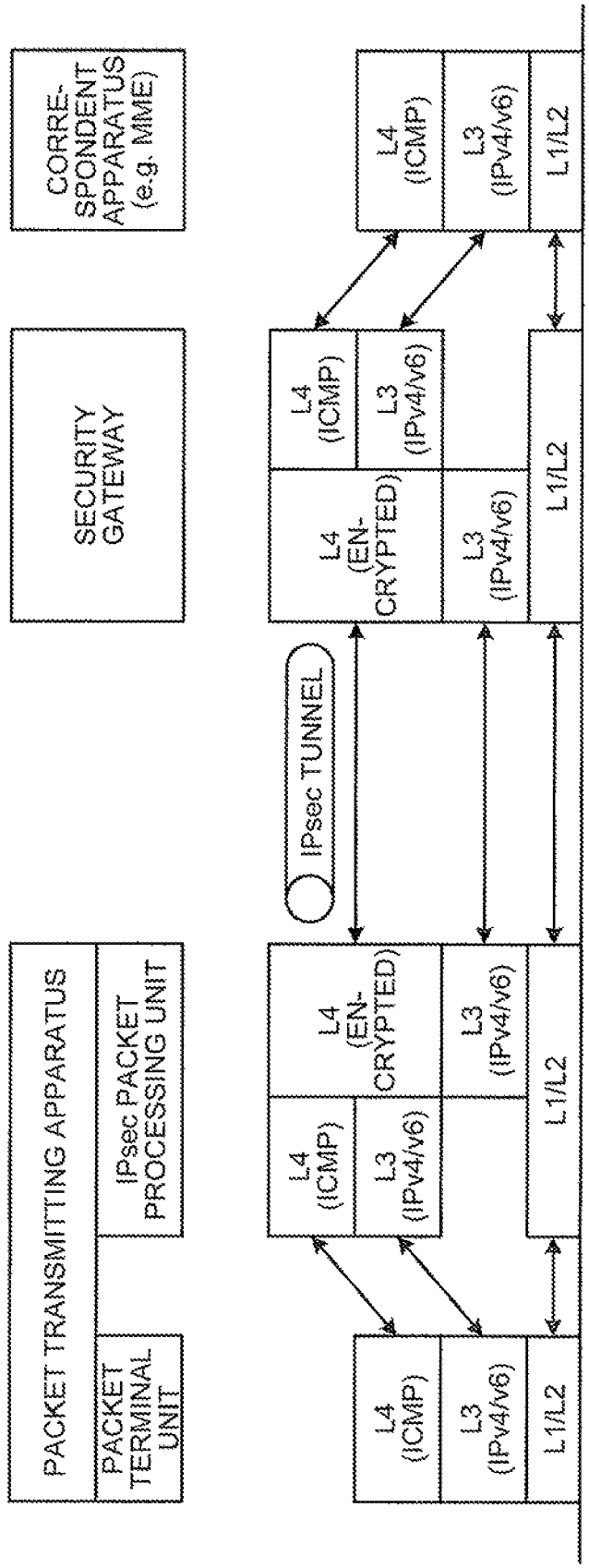
FIG. 7 is a second drawing depicting another example of a protocol stack related to the packet transmitting apparatus according to the first embodiment.

Next, the transmission of an echo-based dummy packet will be explained more specifically, with reference to FIGS. 6 and 7. FIG. 6 is a first drawing depicting an example of a protocol stack related to the packet transmitting apparatus according to the first embodiment. FIG. 7 is a second drawing depicting another example of a protocol stack related to the packet transmitting apparatus according to the first embodiment.

The packet transmitting apparatus 10 illustrated in FIGS. 6 and 7 performs communication with a Mobility Management Entity (MME) serving as a correspondent apparatus.

First, with reference to FIG. 6, an example in which an echo request contained in a dummy packet uses General Packet Radio Service Tunneling Protocol User Data Tunneling (GTP-U) will be explained.

When generating an echo-based dummy packet by using GTP-U, which is a protocol that operates in an application layer, the packet transmitting apparatus 10 generates a dummy packet having the layer structure illustrated in FIG. 6. In this situation, a Layer 3 header stores therein the IP address of the transmission destination.

A Layer 4 header stores therein information defined by a User Datagram Protocol (UDP). A Layer 5 header stores therein information defined by GTP-U and contains information indicating the echo request.

The dummy packet that has been generated by the packet terminal unit 11 is transmitted to the IP packet processing unit 16. In this situation, the packet transmitting apparatus 10 according to the first embodiment transmits information by using a tunnel mode. Thus, of the received dummy packet, the IP packet processing unit 16 encrypts Layer 5 through Layer 3 and stores the encrypted dummy packet into Layer 4. After that, the IP packet processing unit 16 provides Layer 3 with the IP address of a security gateway transmitting the information to the correspondent apparatus and transmits the encrypted dummy packet.

When having obtained the encrypted dummy packet, the security gateway erases the IP address stored in Layer 3 and decrypts the information stored in Layer 4. After that, the security gateway recognizes the IP address of the correspondent apparatus that has been decrypted and transmits the decrypted dummy packet to the recognized correspondent apparatus.

When having obtained the decrypted dummy packet, the correspondent apparatus recognizes the echo request contained in the dummy packet and performs a process to transmit the same information. More specifically, the correspondent apparatus transmits a request requesting that an SA for encrypting the dummy packet should be established to the packet transmitting apparatus 10.

Next, with reference to FIG. 7, an example in which an echo request contained in a dummy packet uses an Internet Control Message Protocol (ICMP) will be explained. In this situation, ICMP is a protocol that is superordinate to Internet Protocol (IP). For this reason, in FIG. 7, it is indicated that the information defined by ICMP is stored in a Layer 4 header.

In the case where the packet transmitting apparatus 10 generates an echo-based dummy packet by using ICMP, which is a protocol that operates in a transport layer, the packet transmitting apparatus 10 generates a dummy packet having the layer structure illustrated in FIG. 7. In this situation, a Layer 3 header stores therein the IP address of the transmission destination. A Layer 4 header stores therein information defined by ICMP and contains information indicating the echo request.

The dummy packet that has been generated by the packet terminal unit 11 is transmitted to the IP packet processing unit 16. Of the received dummy packet, the IP packet processing unit 16 encrypts Layer 4 through Layer 3 and stores the encrypted dummy packet into Layer 4. After that, the IP packet processing unit 16 provides Layer 3 with the IP address of a security gateway transmitting the information to the correspondent apparatus and transmits the encrypted dummy packet.

When having obtained the encrypted dummy packet, the security gateway erases the IP address stored in Layer 3 and decrypts the information stored in Layer 4. After that, the security gateway recognizes the IP address of the correspondent apparatus that has been decrypted and transmits the decrypted dummy packet to the recognized correspondent apparatus.

When having obtained the decrypted dummy packet, the correspondent apparatus recognizes the echo request contained in the dummy packet and performs a process to transmit the same information. More specifically, the correspondent apparatus transmits a request requesting that an SA for encrypting the dummy packet should be established to the packet transmitting apparatus 10.

In the case where the protocol used for managing the SA is in Layer 4 or a superordinate layer thereof, and also, the protocol used for managing the SA includes an echo mechanism, the packet transmitting apparatus 10 transmits an echo-based dummy packet. More specifically, the packet terminal unit 11 generates a dummy packet containing the IP address of the correspondent apparatus 2 and information that is different from the user data, as well as an echo request and transmits the generated dummy packet.

When having obtained information from the packet terminal unit 11, the IP packet processing unit 16 searches for the encryption key used for encrypting the obtained information. In the case where the encryption key has been registered, the IP packet processing unit 16 encrypts the obtained information and transmits the encrypted information to the correspondent apparatus 2. More specifically, when having received a dummy packet, the IP packet processing unit 16 searches the SP database unit 12 for an SP applied to the SP packet. Also, the IP packet processing unit 16 searches the SA database unit 13 for an SA applied to the dummy packet, by referring to the SP that has been found in the search.

As a result of searching the SA database unit 13 for the SA, in the case where the SA applied to the received dummy packet has been established, the IP packet processing unit 16 transmits an SA establishment notification to the packet terminal unit 11.

Conversely, as a result of searching the SA database unit 13 for the SA, in the case where the SA applied to the received dummy packet has not been established, the IP packet processing unit 16 requests the IKE terminal unit 17 that the SA should be established. More specifically, the IP packet processing unit 16 transmits the IP address of the correspondent apparatus 2 contained in the dummy packet to the IKE terminal unit 17 and temporarily stores the dummy packet into the information storage unit 14.

Further, when the SA has been established by the IKE terminal unit 17, the IP packet processing unit 16 stores the SA into the SA database unit 13 and transmits an SA establishment notification to the packet terminal unit 11.

In the case where the SA has been established, the IP packet processing unit 16 judges whether the dummy packet received from the packet terminal unit 11 is an echo-based dummy packet. In the case where the dummy packet received from the packet terminal unit 11 is not an echo-based dummy packet, the IP packet processing unit 16 discards the dummy packet.

In contrast, in the case where the dummy packet received from the packet terminal unit 11 is an echo-based dummy packet, the IP packet processing unit 16 encrypts the dummy packet by using the SA and transmits the encrypted dummy packet to the correspondent apparatus 2.

Further, the IP packet processing unit 16 receives the user data from the packet terminal unit 11, encrypts the user data by using the established SA, and transmits the encrypted user data to the correspondent apparatus 2.

For example, the IP packet processing unit 16 receives the user data from the packet terminal unit 11 and searches the SA database unit 13 for the SA, by referring to the SP that corresponds to the user data. Further, the IP packet processing unit 16 encrypts the user data by using the SA found in the search and transmits the encrypted user data to the correspondent apparatus 2.

The IKE terminal unit 17 generates an encryption key used for encrypting information to be transmitted to the correspondent apparatus 2, by using the dummy packet that has been generated by the packet terminal unit 11. More specifically, by using the IP address of which the IKE terminal unit 17 has been notified by the IP packet processing unit 16, the IKE terminal unit 17 identifies the correspondent apparatus 2 and generates the encryption key by performing a key exchange process with the identified correspondent apparatus 2 while using an Internet Key Exchange (IKE) protocol. Further, the IKE terminal unit 17 stores the generated encryption key into the SA database unit 18, and also, transmits the generated encryption key to the IP packet processing unit 16.

In this situation, the method used by the IKE terminal unit 17 to generate the encryption key while using an IKE process may be any method permitted by the IKE protocol. For example, it is acceptable to use a Diffie-Hellman exchanging method. When having generated the encryption key used for encrypting the information to be transmitted by the packet transmitting apparatus 10, the IKE terminal unit 17 stores the generated encryption key into the SA database unit 18. Also, the IKE terminal unit 17 transmits the generated encryption key to the IP packet processing unit 16.

Figure 2:
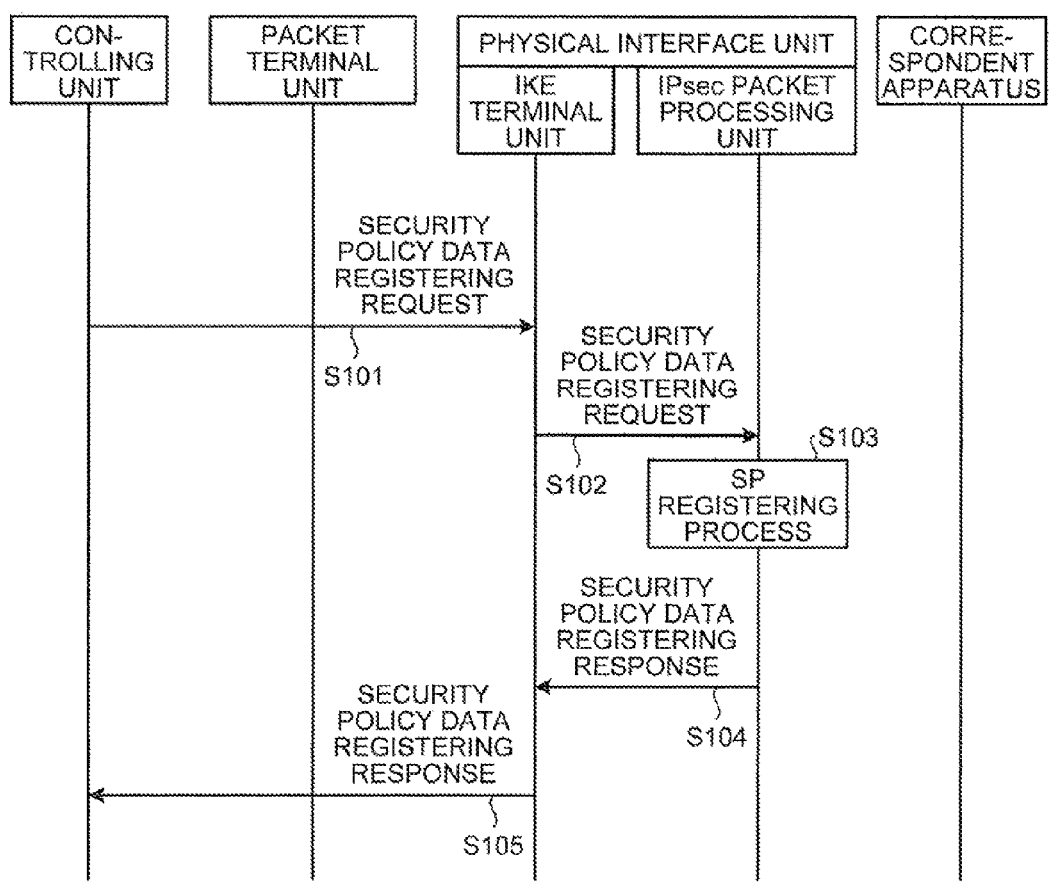
FIG. 2 is a sequence chart for explaining an SP registering process performed by the packet transmitting apparatus according to the first embodiment.

Next, a flow of a process in which the packet transmitting apparatus 10 encrypts the information to be transmitted and transmits the encrypted information to the correspondent apparatus 2 will be explained with reference to the drawings. First, a process in which the controlling unit 1 stores an SP into the SP database unit 12 will be explained, with reference to FIG. 2. FIG. 2 is a sequence chart for explaining an SP registering process performed by the packet transmitting apparatus according to the first embodiment.

First, the controlling unit 1 requests the IKE terminal unit 17 that an SP should be registered (step S101). When having received the SP registering request from the controlling unit 1, the IKE terminal unit 17 requests the IP packet processing unit 16 that the SP should be registered (step S102). After that, when having received the SP registering request from the IKE terminal unit 17, the IP packet processing unit 16 registers the SP into the SP database unit 12 (step S103).

Subsequently, when having registered the SP into the SP database unit 12, the IP packet processing unit 16 notifies the IKE terminal unit 17 of an SP registering response (step S104). After that, when having received the SP registering response from the IP packet processing unit 16, the IKE terminal unit 17 notifies the controlling unit 1 of the SP registering response (step S105).

Figure 3:
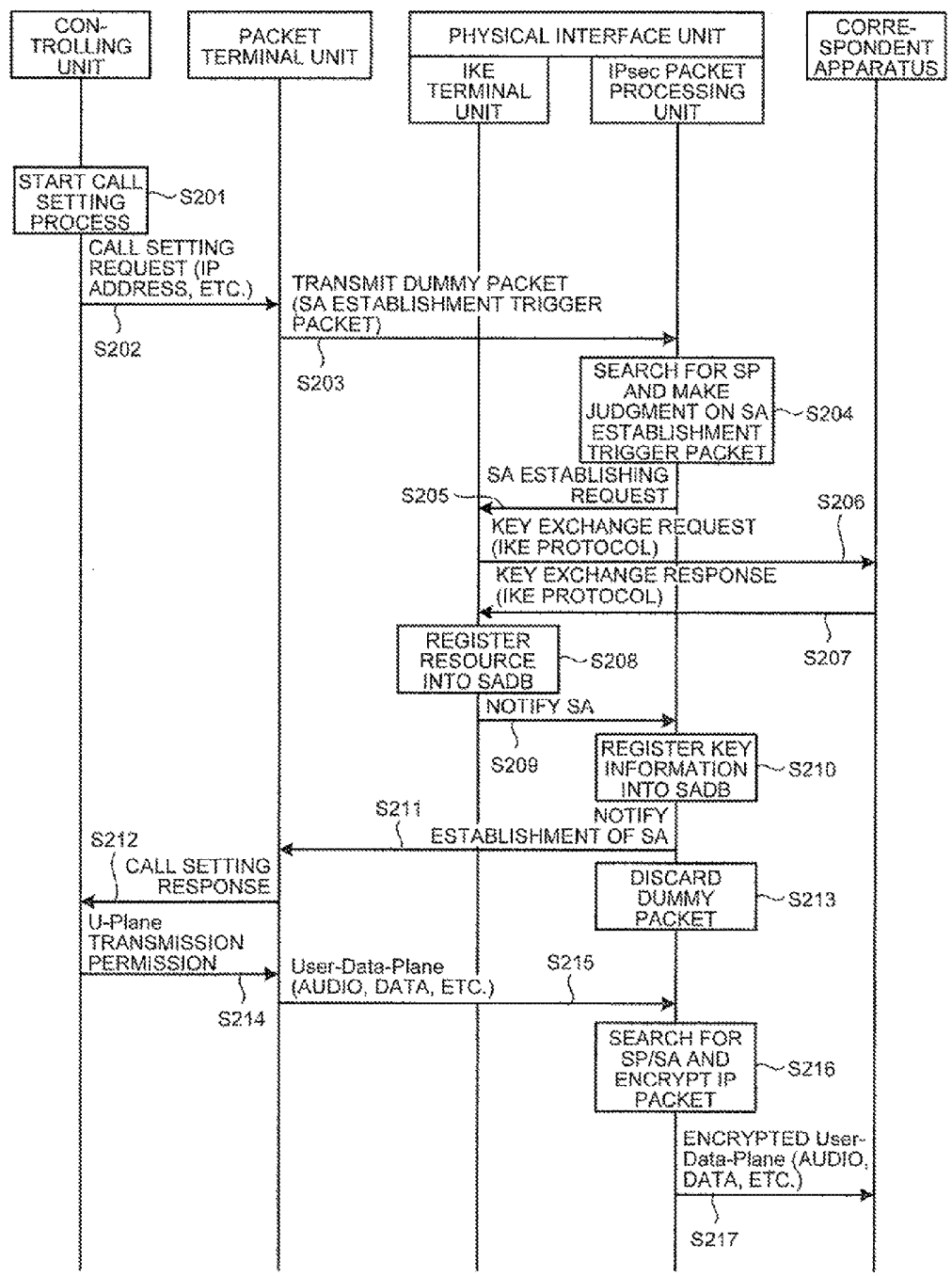
FIG. 3 is a first sequence chart of a process performed by the packet transmitting apparatus according to the first embodiment.

Next, a flow of a transmitting process performed by the packet transmitting apparatus 10 will be explained, with reference to FIG. 3. FIG. 3 is a first sequence chart of a process performed by the packet transmitting apparatus according to the first embodiment. In the example illustrated in FIG. 3, the dummy packet generated by the packet terminal unit 11 is not an echo-based dummy packet.

In the case where user data to be transmitted is present (step S201), the controlling unit 1 notifies the packet terminal unit 11 of a call setting request (step S202). After that, the packet terminal unit 11 generates a dummy packet and transmits the generated dummy packet to the IP packet processing unit 16 (step S203).

Subsequently, when having received the dummy packet, the IP packet processing unit 16 searches the SP database unit 12 for an SP applied to the dummy packet. After that, when the SP that has been found in the search indicates that the dummy packet should be encrypted, the IP packet processing unit 16 searches the SA database unit 13 for the SA indicated by the SP that has been found in the search (step S204).

In the case where the SA indicated by the SP that has been found in the search is not stored in the SA database unit 13 at step S204, the IP packet processing unit 16 requests the IKE terminal unit 17 that the SA should be established with the transmission destination of the dummy packet (step S205).

Subsequently, when having received the SA establishing request at step S205, the IKE terminal unit 17 requests the correspondent apparatus 2 to perform a key exchange process that uses the IKE process (step S206). After that, when having obtained a response to the key exchange request (step S207), the IKE terminal unit 17 generates an encryption key and registers the generated encryption key into the SA database unit 18 (step S208).

Subsequently, the IKE terminal unit 17 transmits the generated encryption key to the IP packet processing unit 16 (step S209). Also, the IP packet processing unit 16 registers the encryption key that has been received from the IKE terminal unit 17 into the SA database unit 13 (step S210).

When having registered the encryption key into the SA database unit 18, the IP packet processing unit 16 notifies the packet terminal unit 11 that the SA has been established (step S211).

When having transmitted the SA establishment notification to the packet terminal unit 11, the IP packet processing unit 16 judges whether the dummy packet is an echo-based dummy packet. In the example illustrated in FIG. 3, because the dummy packet is not an echo-based dummy packet, the IP packet processing unit 16 discards the dummy packet (step S213).

When having received the SA establishment notification (step S211), the packet terminal unit 11 transmits a call setting response, which is a response to the call setting request made at step S202, to the controlling unit 1 (step S212).

When having received the call setting response, the controlling unit 1 transmits user-data transmission permission to the packet terminal unit 11 (step S214). After that, when having received the user-data transmission permission, the packet terminal unit 11 obtains the user data and transmits the obtained user data to the IP packet processing unit 16 (step S215).

When having obtained the user data, the IP packet processing unit 16 searches for the SA by referring to the SP corresponding to the obtained user data and encrypts the user data by using the SA found in the search (step S216). After that, the IP packet processing unit 16 transmits the encrypted user data to the correspondent apparatus 2 and ends the transmitting process (step S217).

Figure 4:
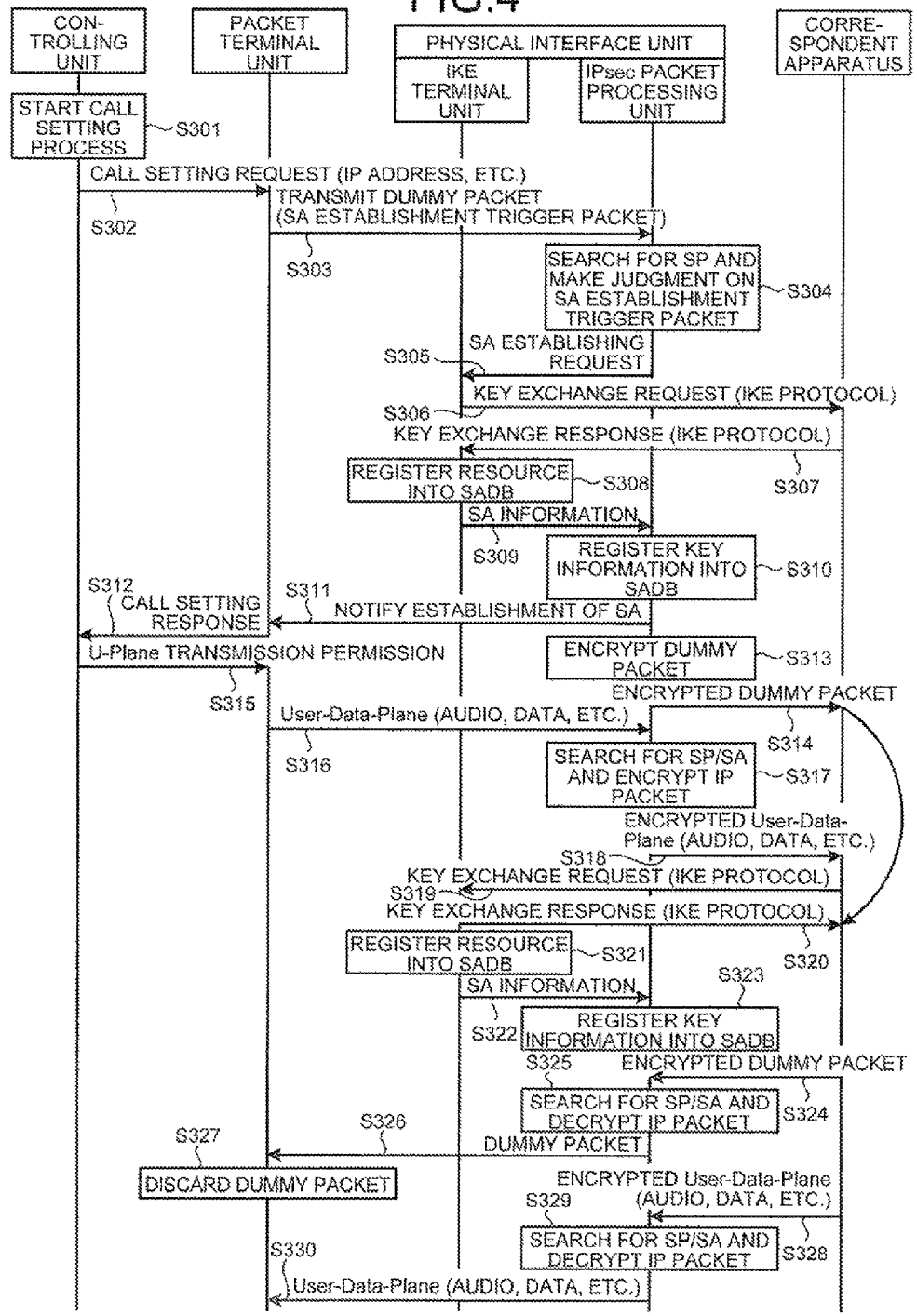
FIG. 4 is a second sequence chart of another process performed by the packet transmitting apparatus according to the first embodiment.

Next, a flow in a process in which the packet transmitting apparatus 10 according to the first embodiment establishes an SA and transmits user data by using an echo-based dummy packet will be explained, with reference to FIG. 4. FIG. 4 is a second sequence chart of another process performed by the packet transmitting apparatus according to the first embodiment.

In the case where user data to be transmitted is present (step S301), the controlling unit 1 notifies the packet terminal unit 11 of a call setting request (step S302). When having received the call setting request, the packet terminal unit 11 generates an echo-based dummy packet and transmits the generated dummy packet to the IP packet processing unit 16 (step S303).

Subsequently, when having received the dummy packet, the IP packet processing unit 16 searches the SP database unit 12 for an SP applied to the dummy packet (step S304). After that, in the case where the SP that has been found in the search indicates that the dummy packet should be encrypted, the IP packet processing unit 16 searches the SA database unit 13 for the SA indicated by the SP that has been found in the search (step S304).

In the case where the SA indicated by the SP that has been found in the search is not stored in the SA database unit 13 at step S304, the IP packet processing unit 16 requests the IKE terminal unit 17 that the SA should be established (step S305).

When having received the SA establishing request at step S305, the IKE terminal unit 17 requests the correspondent apparatus 2 to perform a key exchange process that uses the IKE process (step S306). After that, when having obtained a response to the key exchange request (step S307), the IKE terminal unit 17 generates an encryption key and registers the generated encryption key into the SA database unit 18 (step S308).

Subsequently, the IKE terminal unit 17 transmits the generated encryption key to the IP packet processing unit 16 (step S309). The IP packet processing unit 16 registers the encryption key that has been received from the IKE terminal unit 17 into the SA database unit 13 (step S310).

When having registered the encryption key into the SA database unit 13 (step S310), the IP packet processing unit 16 notifies the packet terminal unit 11 that the SA has been established (step S311). Further, when having received the SA establishment notification (step S311), the packet terminal unit 11 transmits a call setting response, which is a response to the call setting request made at step S302, to the controlling unit 1 (step S312).

In this situation, in the example illustrated in FIG. 4, because the dummy packet is an echo-based dummy packet, the IP packet processing unit 16 encrypts the dummy packet (step S313). More specifically, the IP packet processing unit 16 searches for the SA, by referring to the SP applied to the dummy packet. Also, the IP packet processing unit 16 encrypts the dummy packet by using the SA that has been found in the search.

After that, the IP packet processing unit 16 transmits the encrypted dummy packet to the correspondent apparatus 2 (step S314). In this situation, the packet transmitting apparatus 10 has encrypted the echo-based dummy packet and transmitted the encrypted echo-based dummy packet. When having received the encrypted echo-based dummy packet, the correspondent apparatus 2 serving as the transmission destination encrypts the dummy packet to be returned and transmits the encrypted dummy packet.

At the point in time when the process at step S314 is performed, however, the packet transmitting apparatus 10 and the correspondent apparatus 2 have generated only the encryption key used for encrypting the information transmitted from the packet transmitting apparatus 10 and used by the correspondent apparatus 2 for decrypting the encrypted information. Thus, before returning the echo-based dummy packet, the correspondent apparatus 2 generates an encryption key used for encrypting information to be transmitted to the packet transmitting apparatus 10 and used by the packet transmitting apparatus 10 for decrypting the encrypted information (step S319).

In contrast, the packet transmitting apparatus 10 owns the encryption key used for encrypting the information to be transmitted to the correspondent apparatus 2. Thus, after having transmitted the encrypted dummy packet, the packet transmitting apparatus 10 transmits encrypted user data to the correspondent apparatus 2.

For example, when having received the call setting response, the controlling unit 1 transmits user-data transmission permission to the packet terminal unit 11 (step S315). Further, when having received the user-data transmission permission, the packet terminal unit 11 obtains the user data and transmits the obtained user data to the IP packet processing unit 16 (step S316).

When having received the user data, the IP packet processing unit 16 searches for the SA by referring to the SP corresponding to the user data and encrypts the user data by using the SA that has been found in the search (step S317). After that, the IP packet processing unit 16 transmits the encrypted user data to the correspondent apparatus 2 (step S318).

In this situation, the IKE terminal unit 17 receives a request requesting that the encryption key should be generated from the correspondent apparatus 2 that has obtained the encrypted dummy packet at step S314 (step S319). After that, when having requested by the correspondent apparatus 2 to exchange the encryption key used for encrypting the information to be transmitted, the IKE terminal unit 17 performs the encryption key exchange process by using the IKE protocol (step S320).

Subsequently, when having generated a decryption key used by the IP packet processing unit 16 for decrypting the encrypted information, the IKE terminal unit 17 stores the generated decryption key into the SA database unit 18 (step S321). Also, the IKE terminal unit 17 transmits information about the SA to the IP packet processing unit 16 (step S322). The IP packet processing unit 16 registers the decryption key that has been received from the IKE terminal unit 17 into the SA database unit 13 (step S323).

When having received the encrypted dummy packet from the correspondent apparatus 2 (step S324), the IP packet processing unit 16 searches for the SA, by referring to the SP applied to the encrypted dummy packet. Also, the IP packet processing unit 16 decrypts the encrypted dummy packet by using the SA that has been found in the search (step S325).

When having decrypted the encrypted dummy packet, the IP packet processing unit 16 transmits the decrypted dummy packet to the packet terminal unit 11 (step S326). In the case where the packet terminal unit 11 has recognized that the received information is a dummy packet, the packet terminal unit 11 discards the dummy packet (step S327).

Also when having received the encrypted user data from the correspondent apparatus 2 (step S328), the IP packet processing unit 16 decrypts the encrypted user data, in the same manner as at step S325 (step S329). Further, the IP packet processing unit 16 transmits the decrypted user data to the packet terminal unit 11 and ends the process (step S330).

Figure 5:
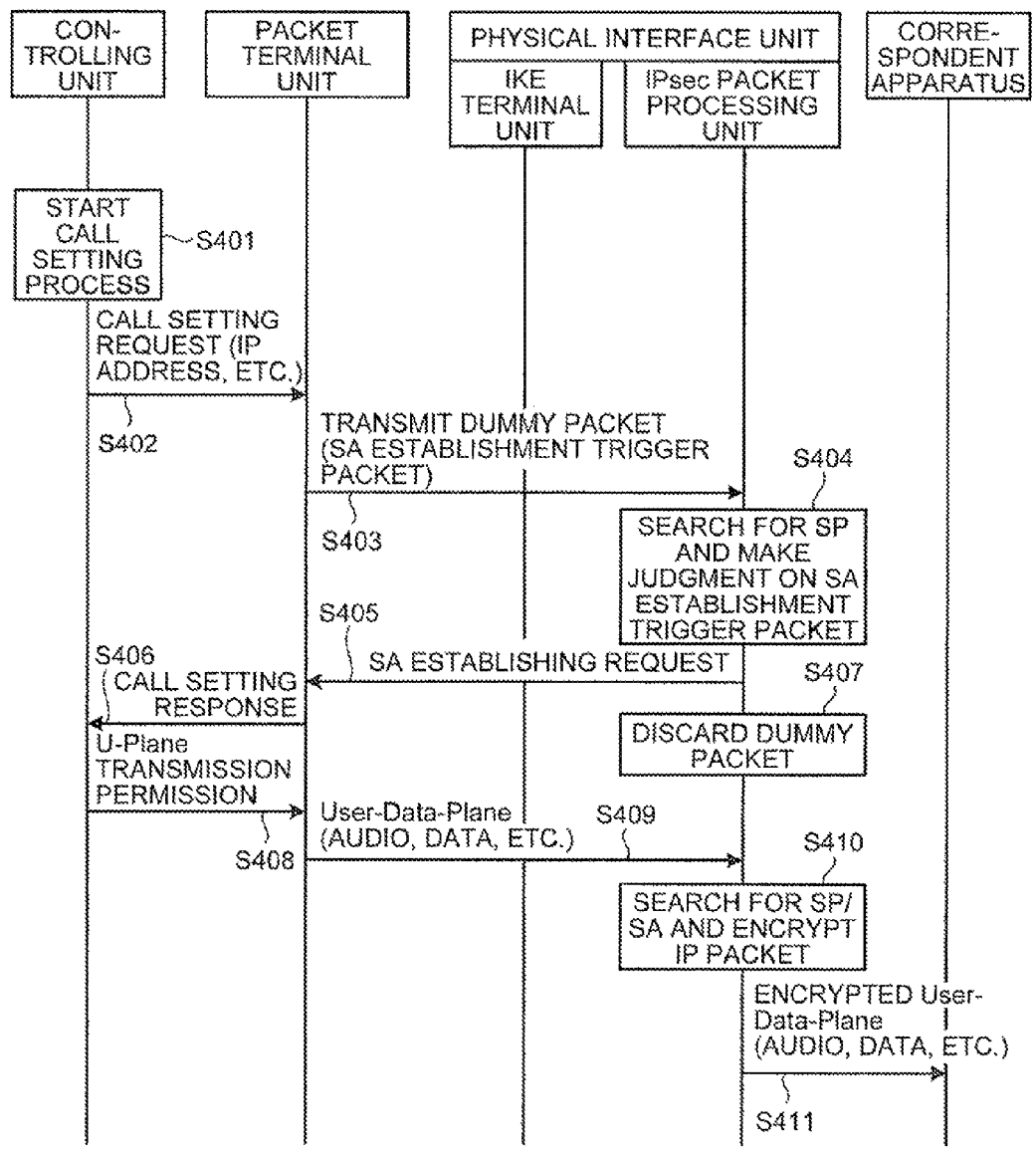
FIG. 5 is a third sequence chart of yet another process performed by the packet transmitting apparatus according to the first embodiment.

Next, a transmitting process that is performed when the packet transmitting apparatus 10 according to the first embodiment has established an SA will be explained, with reference to FIG. 5. FIG. 5 is a third sequence chart for explaining yet another process performed by the packet transmitting apparatus according to the first embodiment.

In the case where user data to be transmitted is present (step S401), the controlling unit 1 notifies the packet terminal unit 11 of a call setting request (step S402). When having received the call setting request, the packet terminal unit 11 generates a dummy packet and transmits the generated dummy packet to the IP packet processing unit 16 (step S403). In the example illustrated in FIG. 5, the generated dummy packet is not an echo-based dummy packet.

After that, when having received the dummy packet, the IP packet processing unit 16 searches the SP database unit 12 for an SP applied to the dummy packet. Subsequently, in the case where the SP that has been found in the search indicates that the dummy packet should be encrypted, the IP packet processing unit 16 searches the SA database unit 13 for the SA indicated by the SP that has been found in the search (step S404).

In the case where the SA indicated by the SP that has been found in the search is stored in the SA database unit 13 at step S404, the IP packet processing unit 16 transmits an SA establishment notification notifying that the SA has been established to the packet terminal unit 11 (step S405). After that, when having received the SA establishment notification, the packet terminal unit 11 notifies the controlling unit 1 of a call setting response (step S406). Also, the IP packet processing unit 16 discards the dummy packet (step S407).

When having received the call setting response, the controlling unit 1 transmits user-data transmission permission to the packet terminal unit 11 (step S408). When having received the user-data transmission permission, the packet terminal unit 11 transmits the user data to the IP packet processing unit 16 (step S409).

When having received the user data, the IP packet processing unit 16 searches for the SA, by referring to the SP corresponding to the received user data. Also, the IP packet processing unit 16 encrypts the user data by using the SA that has been found in the search (step S410). After that, the IP packet processing unit 16 transmits the encrypted user data to the correspondent apparatus 2 (step S411) and ends the process.

As explained above, the packet transmitting apparatus 10 according to the first embodiment generates the dummy packet when being triggered by the receiving of the call setting request from the controlling unit 1 and establishes the SA by using the dummy packet. Also, after the SA has been established, the packet transmitting apparatus 10 transmits the response to the call setting request, obtains the user data to be transmitted, encrypts the user data, and transmits the encrypted user data.

With this arrangement, the packet transmitting apparatus 10 is able to prevent the delays in the transmission of the user data, in contrast to the conventional communication apparatus that establishes an SA when being triggered by obtainment of user data to be transmitted. As a result, in the case where the user data is transmitted after having been encrypted, the packet transmitting apparatus 10 is able to transmit the user data without losing the real-time characteristics of the user data.

In the case where a video conference system is considered as an example in which the user data is to be transmitted, the packet transmitting apparatus 10 has already established an SA with a transmission destination at the point in time when moving pictures and audio have been obtained as the user data. As a result, the packet transmitting apparatus 10 is able to encrypt and transmit the user data without delays.

Also, the packet transmitting apparatus 10 generates the echo-based dummy packet, encrypts the generated dummy packet, and transmits the encrypted dummy packet to the correspondent apparatus 2. Thus, the packet transmitting apparatus 10 is able to establish an SA in one of various modes.

For example, in the case where only the information to be transmitted needs to be encrypted, in other words, in the case where only the communication in one way needs to be encrypted, the packet transmitting apparatus 10 generates a dummy packet that is not echo-based. In contrast, in the case where encrypted information is used in bidirectional communication, the packet transmitting apparatus 10 generates an echo-based dummy packet.

In the case where the packet transmitting apparatus 10 has encrypted an echo-based dummy packet and has transmitted the encrypted echo-based dummy packet to the correspondent apparatus 2, the correspondent apparatus 2 requests the packet transmitting apparatus 10 that an SA should be established. Thus, the packet transmitting apparatus 10 is able to dynamically establish bidirectional SAs without the need to apply any modifications to the existing correspondent apparatus 2. Further, when an echo-based dummy packet has been returned, the packet transmitting apparatus 10 is able to recognize that the bidirectional SAs have been established.

The first embodiment of the present invention has been explained above; however, it is possible to implement the present invention in various embodiments other than the exemplary embodiments described above. Some other exemplary embodiments will be explained below, as a second embodiment of the present invention.

(1) With Regard to the Dummy Packet

In relation to the packet transmitting apparatus according to the first embodiment, the examples in which the headers defined by GTP-U and ICMP are used are explained above, as the examples in which an echo-based dummy packet is generated. A packet transmitting apparatus according to the second embodiment, however, is not limited to these examples. Any protocol that allows an echo request to be contained is able to achieve the object of the present invention. The reason is that, when having transmitted an echo-based dummy packet, the packet transmitting apparatus is able to establish bidirectional SAs regardless of the type of the communication protocol.

(2) With Regard to the Packet Transmitting Apparatus

The packet transmitting apparatus according to the first embodiment is applicable to situations in which the IPsec protocol is implementable. Thus, the packet transmitting apparatus according to the first embodiment may be incorporated not only into an apparatus included in a wired network, but also into an apparatus included in a wireless network.

Figure 8:
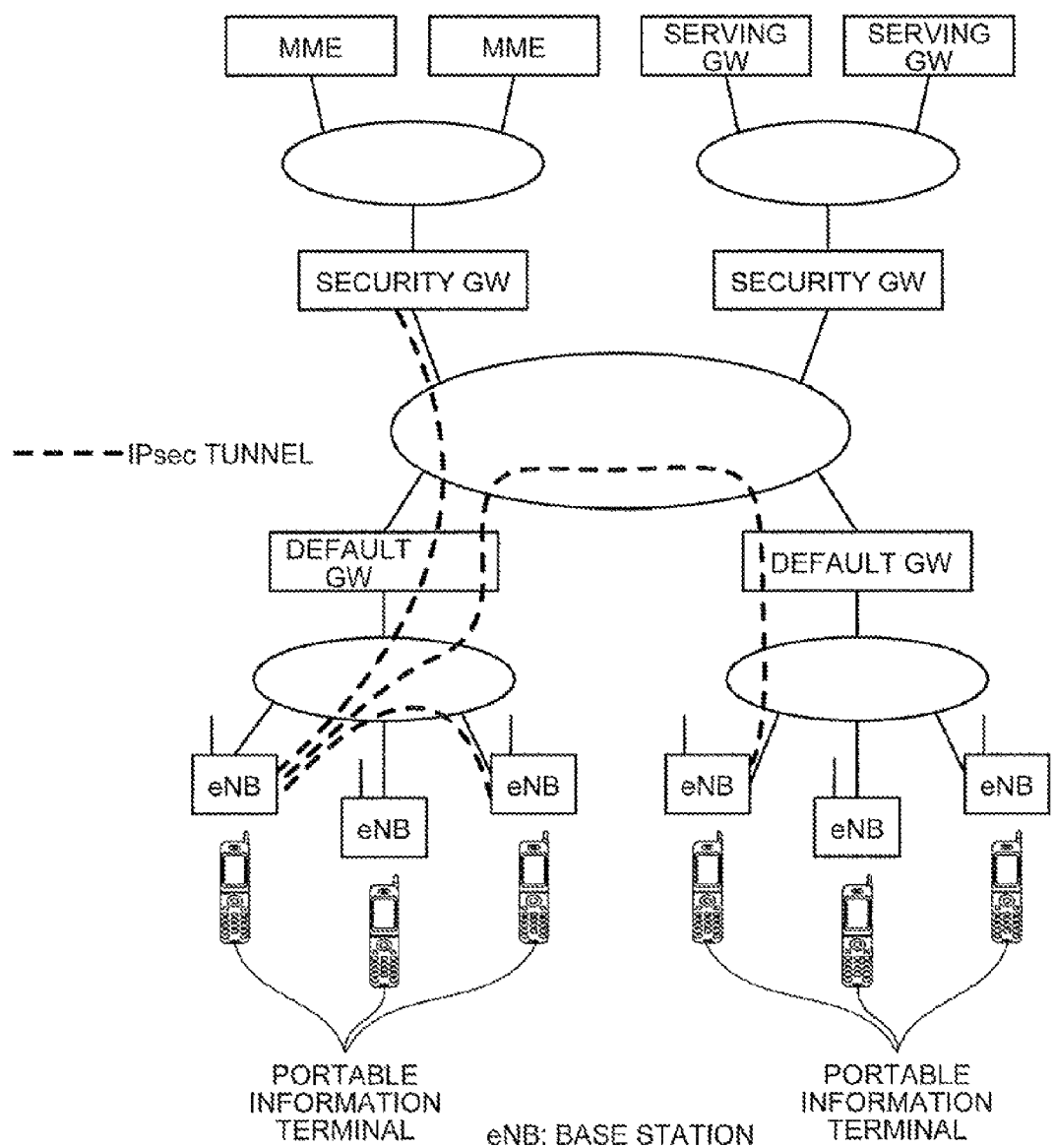
FIG. 8 is a diagram of an exemplary configuration of a Long Term Evolution (LTE) wireless network.

Next, as an exemplary embodiment of the packet transmitting apparatus 10, a wireless network in which portable information terminals are used will be explained, with reference to FIG. 8. FIG. 8 is a diagram of an exemplary configuration of a Long Term Evolution (LTE) wireless network. In the example illustrated in FIG. 8, the communication within the network is performed as encrypted communication using IPsec.

In many situations, portable information terminals transmit and receive information having high level of real-time characteristics. However, because portable information terminals move occasionally, every time the base station relaying user data has changed to another base station, a new SA needs to be established. In addition, the transmission destination apparatus (e.g., the gateway) to which each of the portable information terminals is connected changes depending on the type of the application used by the portable information terminal, and a new SA therefore needs to be established.

Further, for each of the portable information terminals, a large number of types of communication devices are present in the network. In addition, communication devices such as servers and gateways are added, while the wireless network is in an operating state. Thus, it is difficult to establish an SA in advance for each of all the communication paths.

Further, for conventional portable information terminals, there is an upper limit as to how many SAs can be established by each of the base stations. Thus, in the case where the number of SAs has exceeded the upper limit for the base station, it is not possible to establish an SA. As a result, a conventional portable information terminal that is configured so as to establish an SA when being triggered by user data suspends or disregards the user data when it is not possible to establish the SA.

In contrast, however, when performing encrypted communication, the packet transmitting apparatus according to the second embodiment is able to dynamically establish an SA when being triggered by a call setting request. In addition, because the packet transmitting apparatus according to the second embodiment establishes a call setting after an SA has been established, the packet transmitting apparatus is able to perform communication without suspending the information to be transmitted.

As a result, portable information terminals are able to perform encrypted communication without being concerned about handovers. In addition, in the case where a portable information terminal has transmitted an echo-based dummy packet, the portable information terminal is able to check to see if bidirectional SAs have been established.

(3) With Regard to Encrypted Communication

As an example of the encrypting process, the packet transmitting apparatus according to the first embodiment encrypts information that is to be transmitted by using the tunnel mode defined by the IPsec protocol. The packet transmitting apparatus according to the second embodiment, however, is not limited to this example. For example, it is acceptable to use a transport mode.

The reason is that the packet transmitting apparatus according to the first embodiment is able to encrypt and transmit the information to be transmitted without losing the real-time characteristics thereof, no matter what method is used to encrypt the information to be transmitted.

Further, the packet transmitting apparatus according to the first embodiment establishes an SA applied to each of the receiving ports at the transmission destinations; however, the packet transmitting apparatus according to the second embodiment is not limited to this example. For example, the packet transmitting apparatus according to the second embodiment may establish an SA that is applied to each of the IP addresses at the transmission destinations. Alternatively, the packet transmitting apparatus according to the second embodiment may establish an SA that is applied either to each of the IP addresses at the transmission destinations or to each of the receiving ports at the transmission destinations, depending on the type of the information to be transmitted.

(4) With Regard to the Key Exchange Process

The packet transmitting apparatus according to the first embodiment uses the Diffie-Hellman exchanging method, as an example that realizes a safe key exchange process; however, the packet transmitting apparatus according to the second embodiment is not limited to this example. For example, the packet transmitting apparatus may use elliptic curve cryptography. The reason is that, when performing encrypted communication by using IPsec, the packet transmitting apparatus is able to achieve the object thereof, no matter which one of the plurality of key exchange protocols that are defined by the IKE protocol is used.

(5) With Regard to the SA Database Unit

Figure 9:
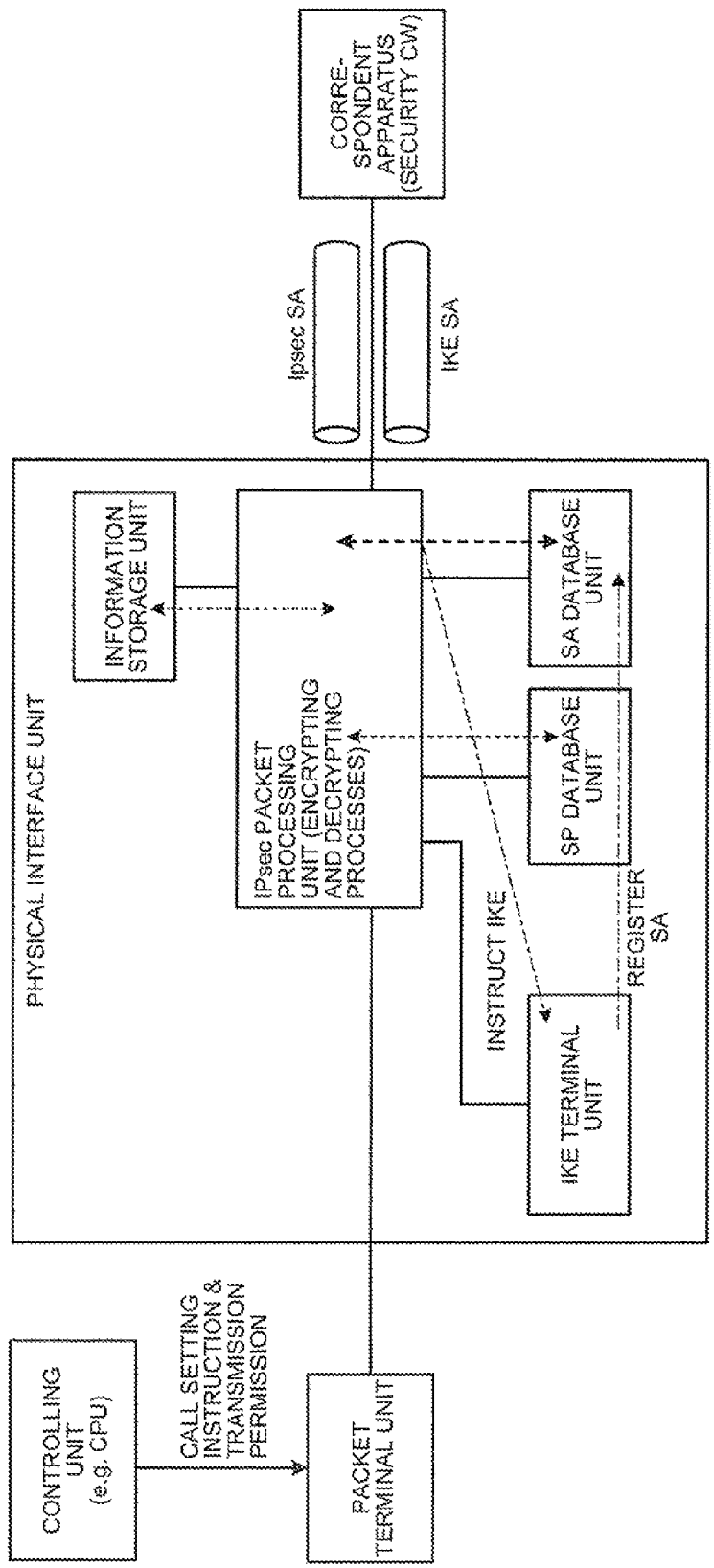
FIG. 9 is a diagram depicting another exemplary configuration of a packet transmitting apparatus.

The packet transmitting apparatus according to the first embodiment includes the SA database unit used by the IP packet processing unit and the SA database unit used by the IKE terminal unit; however, the packet transmitting apparatus according to the second embodiment is not limited to this example. For example, another arrangement is acceptable in which, as illustrated in FIG. 9, the IP packet processing unit and the IKE terminal unit both use the same SA database unit. FIG. 9 is a diagram depicting another exemplary configuration of the packet transmitting apparatus.

(6) Computer Programs

In the examples described above, the packet transmitting apparatus according to the first embodiment realizes the various types of processes by using the hardware; however, the packet transmitting apparatus according to the second embodiment is not limited to this example. Another arrangement is acceptable in which the packet transmitting apparatus realizes the various types of processes by having a computer execute one or more computer programs that have been prepared in advance.

Figure 10:
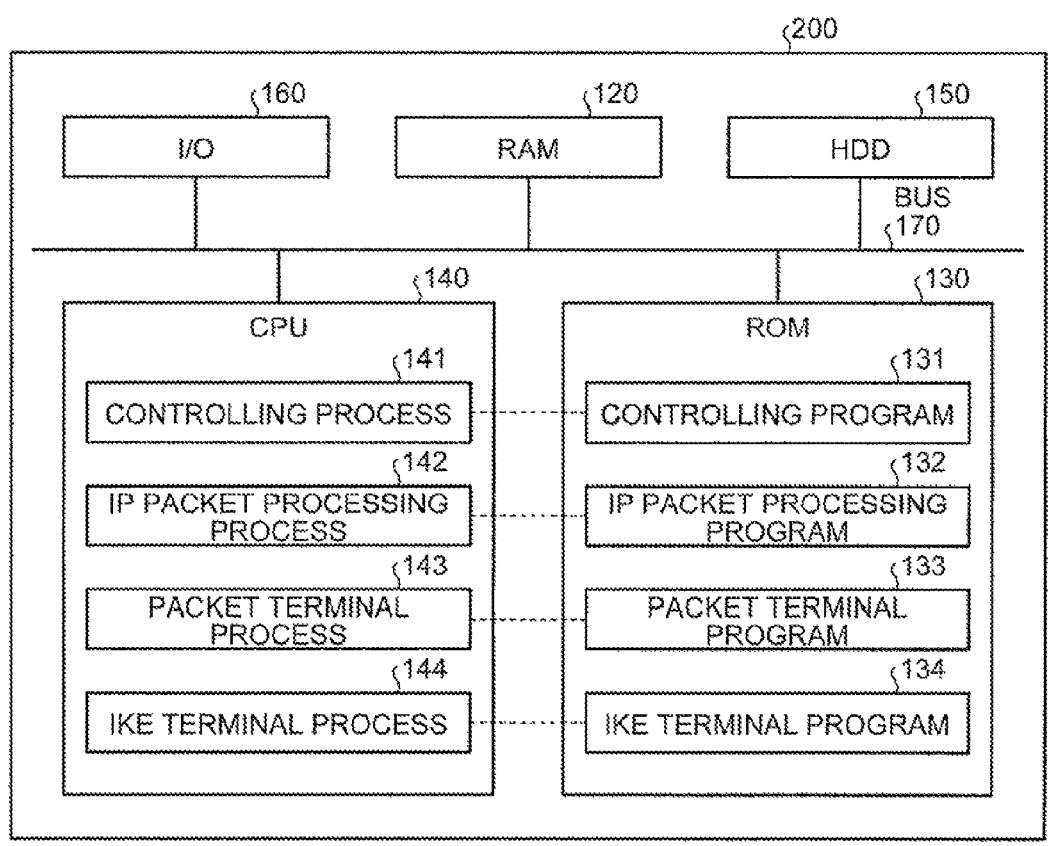
FIG. 10 is a diagram of a computer that transmits an encrypted packet.
Figure 11:
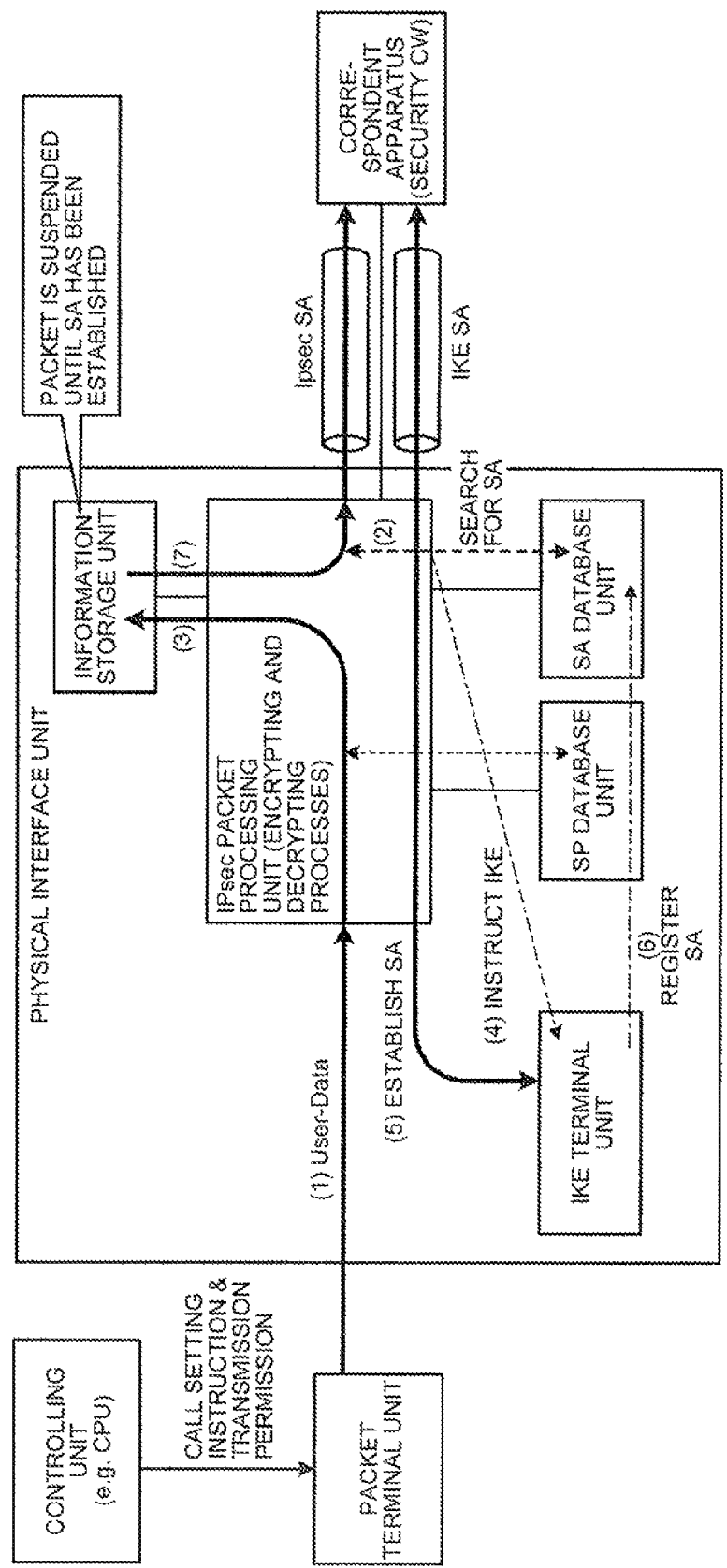
FIG. 11 is a first drawing for explaining a conventional technique.
Figure 12:
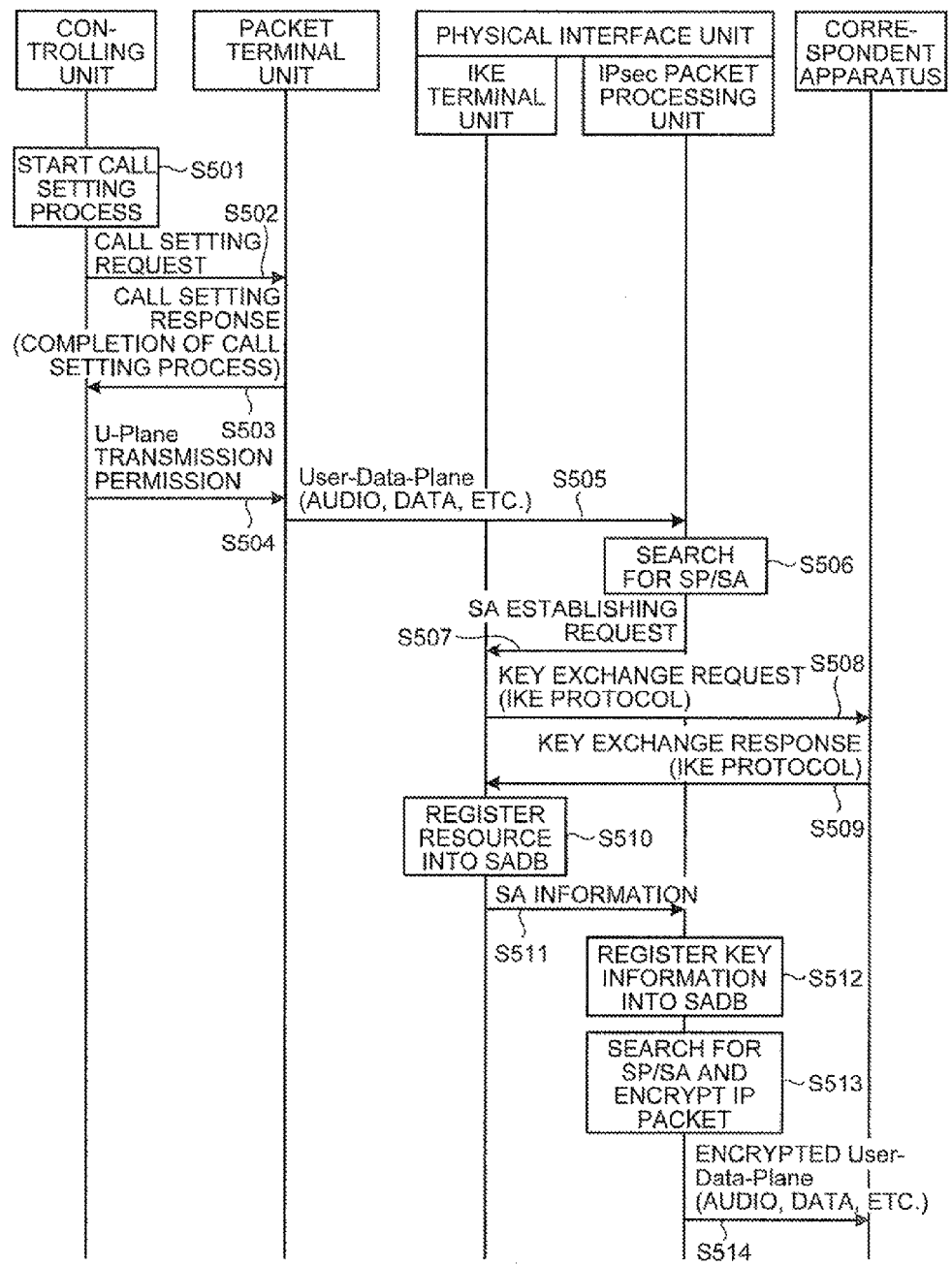
FIG. 12 is a second drawing for explaining the conventional technique.

In the following sections, an example in which a computer executes computer programs (hereinafter, "programs") having the same functions as those of the packet transmitting apparatus according to the first embodiment will be explained, with reference to FIG. 10. FIG. 10 is a diagram of a computer that transmits an encrypted packet.

A computer 200 illustrated in FIG. 10 as an example is configured with a Hard Disk Drive (HDD), a Random Access Memory (RAM) 120, a Read-Only Memory (ROM) 130, and a Central Processing Unit (CPU) 140 that are connected to one another with a bus 170. Further, a connection terminal portion Input/Output (I/O) 160 used for making a connection to a correspondent apparatus or the like is connected to the bus 170.

The ROM 130 stores therein, in advance, a controlling program 131, an IP packet processing program 132, a packet terminal program 133, and an IKE terminal program 134. When the CPU 140 reads the programs 131 to 134 from the ROM 130 and executes the read programs, the programs 131 to 134 function as a controlling process 141, an IP packet processing process 142, a packet terminal process 143, and an IKE terminal process 144, as illustrated in FIG. 10.

The processes 141 to 144 correspond to the controlling unit 1, the IP packet processing unit 16, the packet terminal unit 11, and the IKE terminal unit 17 that are illustrated in FIG. 1, respectively.

The programs 131 to 134 do not necessarily have to be stored in the ROM 130. For example, another arrangement is acceptable in which the programs 131 to 134 have been recorded in the HDD 150 and function as the processes 141 to 144 when being loaded by the CPU 140. Yet another arrangement is acceptable in which the programs 131 to 134 are stored in the RAM 120.

Further, the functions of the information storage unit 14, the SP database unit 12, the SA database unit 13, and the SA database unit 18 that are illustrated in FIG. 1 are achieved by the RAM 120 or the HDD 150.

It is possible to realize the packet transmitting unit explained in the exemplary embodiments by having a computer (e.g., a personal computer or a work station) execute a program that is prepared in advance. An arrangement is acceptable in which the program is distributed via a network such as the Internet. Another arrangement is acceptable in which the program is recorded on a computer-readable recording medium such as a hard disk, a flexible disk (FD), a Compact Disk Read-Only Memory (CD-ROM), a Magneto-Optical disk (MO), or a Digital Versatile Disk (DVD) and is executed when having been read from the recording medium by a computer.

According to an aspect of the embodiments disclosed in the present application, dummy transmission data that is information different from the user data is generated before a call setting is established, so that an SA is established by using the generated dummy transmission data.

According to an aspect of the embodiments, it is possible to perform encrypted communication without losing the real-time characteristics.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet transmitting and receiving apparatus comprising:
   a memory; and
   a processor coupled to the memory, wherein
   the processor executes a process comprising:
      generating dummy data to establish a security association for user data;
      transmitting the dummy data to a transmission destination of the user data when the transmitting and receiving apparatus performs encrypted communication with the transmission destination of the user data bidirectionally, the dummy data making the transmission destination of the user data exchange an encryption key with the packet transmitting and receiving apparatus and the dummy data containing information which requests the transmission destination of the user that the transmission destination of the user return the dummy data to the transmitting and receiving apparatus, and not transmitting the dummy data to the transmission destination of the user data when the transmitting and receiving apparatus performs the encrypted communication with the transmission destination of the user data one-way;
      establishing the security association for the user data in accordance with the dummy data.

2. The packet transmitting and receiving apparatus according to claim 1, wherein the transmitting includes transmitting the dummy data for each of transmission destinations each of which is to receive the user data.

3. A packet transmitting and receiving method comprising:
   generating dummy data to establish a security association for user data;
   transmitting the dummy data to a transmission destination of the user data when the transmitting and receiving apparatus performs encrypted communication with the transmission destination of the user data bidirectionally, the dummy data making the transmission destination of the user data exchange an encryption key with a transmission origin of the user data and the dummy data containing information which requests the transmission destination of the user that the transmission destination of the user return the dummy data to the transmitting and receiving apparatus, and not transmitting the dummy data to the transmission destination of the user data when the transmitting and receiving apparatus performs the encrypted communication with the transmission destination of the user data one-way;

establishing the security association for the user data in accordance with the dummy data.

4. The packet transmitting and receiving method according to claim 3, wherein the transmitting includes transmitting the dummy data for each of transmission destinations each of which is to receive the user data.

* * * * *